United States Patent
Frampton et al.

(10) Patent No.: US 10,108,165 B2
(45) Date of Patent: Oct. 23, 2018

(54) PROTECTIVE FUNCTIONS FOR PARALLEL GENERATORS

(71) Applicant: Kohler Co., Kohler, WI (US)

(72) Inventors: Isaac S. Frampton, Strattanville, PA (US); Douglas W. Dorn, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 119 days.

(21) Appl. No.: 15/257,335

(22) Filed: Sep. 6, 2016

(65) Prior Publication Data

US 2016/0370782 A1    Dec. 22, 2016

Related U.S. Application Data

(62) Division of application No. 14/459,007, filed on Aug. 13, 2014, now Pat. No. 9,467,080.

(51) Int. Cl.
| | |
|---|---|
| *H02P 9/00* | (2006.01) |
| *G05B 19/042* | (2006.01) |
| *H02J 3/48* | (2006.01) |
| *H02J 3/50* | (2006.01) |
| *G05B 11/01* | (2006.01) |
| *G05B 13/02* | (2006.01) |
| *G05F 1/66* | (2006.01) |
| *H02J 3/46* | (2006.01) |

(52) U.S. Cl.
CPC .......... *G05B 19/0428* (2013.01); *G05B 11/01* (2013.01); *G05B 13/021* (2013.01); *G05F 1/66* (2013.01); *H02J 3/48* (2013.01); *H02J 3/50* (2013.01); *H02P 9/006* (2013.01); *G05B 2219/14116* (2013.01); *G05B 2219/24132* (2013.01); *H02J 3/46* (2013.01)

(58) Field of Classification Search
CPC ....... H02J 3/38; H02J 3/46; H02J 3/50; H02P 9/06; Y10T 307/718; Y10T 307/724
USPC ....... 290/44, 55; 700/286, 287, 295; 307/84, 307/70, 19; 322/20, 17, 7
See application file for complete search history.

(56) References Cited

U.S. PATENT DOCUMENTS

| | | | |
|---|---|---|---|
| 3,489,914 A | * | 1/1970 | Taylor ........................ H02J 3/38 307/59 |
| 6,066,897 A | | 5/2000 | Nakamura |
| | | | (Continued) |

FOREIGN PATENT DOCUMENTS

| | | |
|---|---|---|
| EP | 2163909 | 3/2010 |
| EP | 2654157 | 10/2013 |
| | (Continued) | |

OTHER PUBLICATIONS

European Search Report and Written Opinion cited in EP15180478, dated Oct. 16, 2015.

*Primary Examiner* — Julio C. Gonzalez Ramirez
(74) *Attorney, Agent, or Firm* — Lempia Summerfield Katz LLC

(57) ABSTRACT

A generator system may include two or more generators electrically connected through a generator bus. A controller receives operation data from a first generator. The operation data may describe a power flow from a second generator to the first generator. From the operation data, either a loss of speed control or a loss of voltage control may be identified at the second generator. The controller may generate a command for the second generator based on the loss of speed control or the loss of voltage control.

16 Claims, 7 Drawing Sheets

(56) References Cited

U.S. PATENT DOCUMENTS

| | | |
|---|---|---|
| 8,766,479 B2 | 7/2014 | Dorn et al. |
| 2009/0108676 A1* | 4/2009 | Algrain ................... H02J 3/42 |
| | | 307/73 |
| 2010/0102637 A1 | 4/2010 | Dozier et al. |
| 2012/0049638 A1 | 3/2012 | Dorn et al. |
| 2012/0205986 A1* | 8/2012 | Frampton ............... H02J 3/381 |
| | | 307/84 |
| 2012/0223531 A1 | 9/2012 | Brooks et al. |
| 2013/0069604 A1 | 3/2013 | Lovejoy |
| 2014/0001769 A1 | 1/2014 | Frampton et al. |
| 2014/0091632 A1 | 4/2014 | Stenson |
| 2014/0203647 A1* | 7/2014 | Sato ........................ H02J 3/00 |
| | | 307/52 |

FOREIGN PATENT DOCUMENTS

| | | |
|---|---|---|
| EP | 2682339 | 1/2014 |
| JP | 2014079100 A * | 5/2014 |

* cited by examiner

PROTECTIVE FUNCTIONS FOR PARALLEL GENERATORS

This application is a divisional under 35 U.S.C. § 121 and 37 C.F.R. 1.53(b) of U.S. patent application Ser. No. 14/459,007 filed on Aug. 13, 2014, the disclosure of which is incorporated herein by reference in its entirety.

TECHNICAL FIELD

This disclosure relates in general to protective functions for parallel generators, or more particularly, protective functions for loss of control of speed or loss of control of excitation in parallel generators.

BACKGROUND

Any breaks in power utility service may be unacceptable to some customers, and some businesses may have mission critical systems, such as computer systems in call centers or refrigerators in grocery stores, that rely on constant power. These customers may rely on a backup source of power.

One or more generators, or engine-generator sets, may provide backup electrical energy to the system when the power utility service fails, provide electrical energy in remote areas where no power is available, or provide supplemental electrical energy to the power utility service. Generators also may experience failures. Some failures may be detected or identified by one or more protective relays. In response to a failure, a protective relay trips a circuit breaker that disconnects the generator from the system. However, in some circumstances, a failure in one generator causes a condition in another generator that triggers the protective relay to disconnect the non-failed generator from the system. Thus, the fully functioning generator is unnecessarily disconnected from the system and the system continues to be fed by a malfunctioning generator.

BRIEF DESCRIPTION OF THE DRAWINGS

Exemplary implementations are described herein with reference to the following drawings.

DETAILED DESCRIPTION

Figure 1:
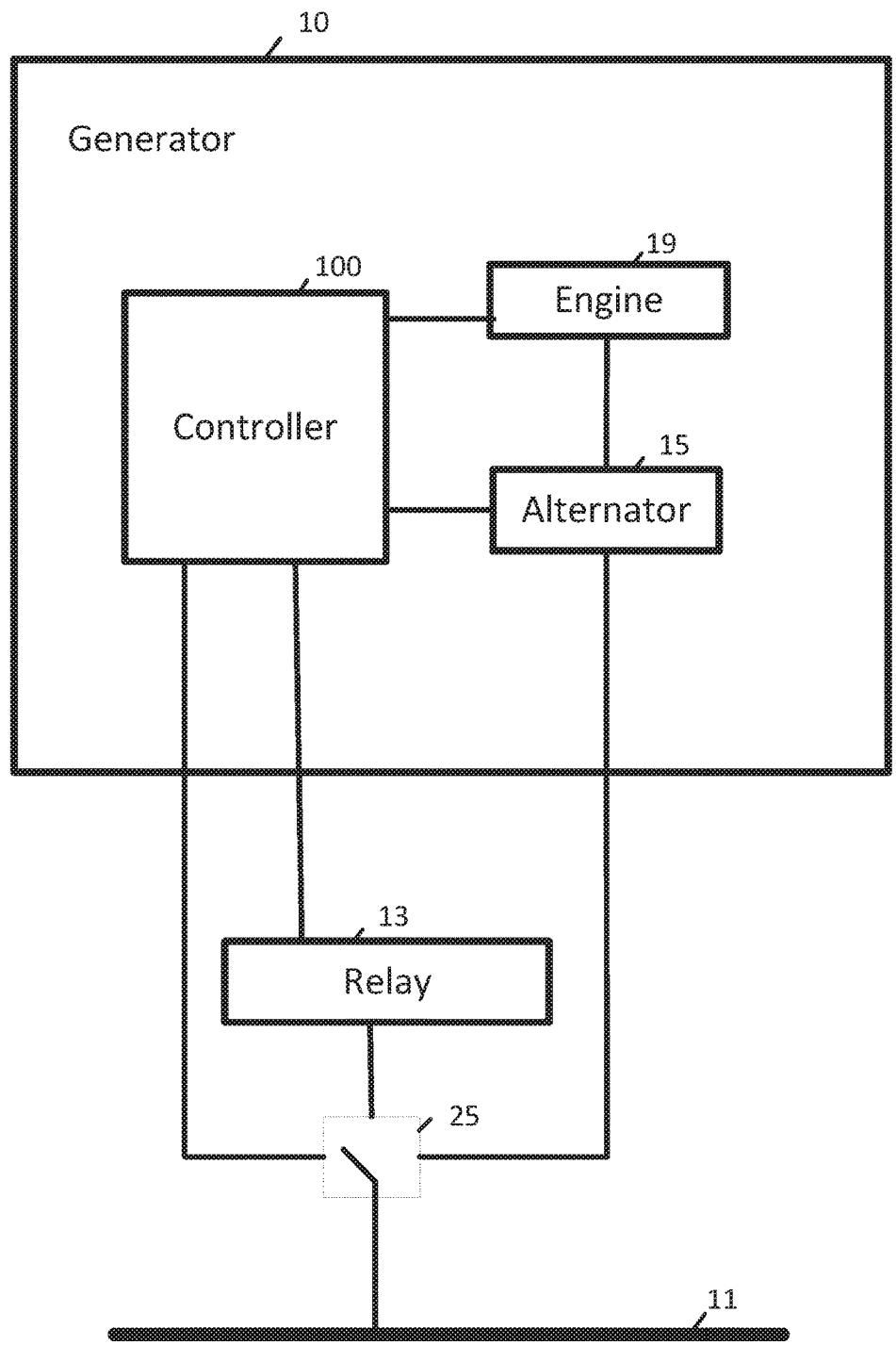
FIG. 1 illustrates an example generator including protective functionality.

An engine-generator set, which may be referred to as a generator or a genset, may include an engine driven alternator or another combination of devices for generating electrical energy or power. One or more generators may provide power to a load through a generator bus. The generator bus is an electrical conductive path and may be selectively connected through multiple circuit breakers or other types of switches to the generators, the utility system, and other devices.

Generators may experience various faults and failures. In some systems, any fault or failure results in disconnecting the generator from the bus. Various components may cause the generator to fail, which may result in no output or an undesirable output to devices connected to the system. However, other faults may be less detrimental. Non-fatal faults may include low oil pressure, high coolant temp, low oil level, low coolant level, or other examples. Some systems may be designed so that such non-fatal faults result in disconnecting the generator from the bus because other generators are available as a backup. The system may include n+1 generators, where n is the minimum number of generators needed to support the system. An additional generator is available in case of a failure.

Generator failures may be identified through monitoring the operation and outputs of generators in a system of coupled generators. When the generator is not operating properly, it may be removed from the system by disconnecting the generator from the bus. Some scenarios may cause failures to be incorrectly associated with a properly functioning generator. In these scenarios, the failure in one generator causes the operation or output of the fully operational generator to appear as if the fully operational generator is experiencing a failure.

Parallel generators provide power to a common load. The parallel generators run at substantially the same speed. Because the generator outputs are electrically connected, the outputs of the generator are at the same voltage. However, power may flow from one generator and to another generator. The real power is a measurement of the torque on the shafts of the generators. When one shaft has a higher torque than the other shaft, that generator produces more real power than the generator with lower torque. If the real power output of a generator is greater than the power required by the load, the other generator may absorb power from that generator. The reactive power is controlled by the excitation of the field windings of the generators. When one generator has higher field excitation, that generator produces more reactive power than generator with the lower field excitation. If the reactive power output of a generator is greater than the reactive power required by the load, the other generator may absorb reactive power from that generator.

Any loads connected to the generator bus may absorb power. Inductive or loads may absorb reactive power, and capacitive loads may generate reactive power. There is a net zero real power between the parallel generators and the load and a net zero reactive power between the generators and the load. That is, any excess real or reactive power that is not absorbed by the load is absorbed by one or more of the generators.

In one example, the malfunction of excitation control in one generator causes the failing generator to produce excessive field current. In another example, an engine governor malfunction in one generator causes the failing generator to produce excessive shaft torque. In these scenarios, which are discussed in more detail below, the malfunctioning generator may produce excessive reactive power, measured in kilovolt-amperes reactive (kVAR), or produce excessive real power, measured in kilowatts (kW). The properly functioning generator may absorb the excess reactive power or real power in an effort to maintain the voltage and speed at a target, or both generators may run at the wrong voltage or wrong speed if the properly functioning generator is not able to absorb enough reactive or real power to maintain voltage and speed at a target. Either case may cause a protective relay to disconnect the properly functioning generator from the bus.

A generator system may operate in different modes. In an emergency mode, non-fatal faults do not disrupt the operation of the generator. In one example, the emergency mode does not allow any faults or failures to disconnect the generator from the bus or shut down the generator. The generator may inform the user (e.g., display a message) when there is a fault or failure but continues to run or attempt to run. The generator continues to run until the failures render the generator inoperable (e.g., the crankshaft locks up when the engine oil is burned to low levels such that the engine is not adequately lubricated).

Some systems run in emergency mode when there is limited space for a second generator, such as in marine applications or recreational vehicles. Other systems may run in emergency mode when a loss of power could be worse than damaging the generator. For example, in some military applications there is no need to disconnect a generator to protect it from further damage because more damage is suffered if the site is without power. Emergency mode operation may be improved when some types of loss of control failures are identified, allowing failing generators in n+1 systems to be disconnected and/or replacement generators to be brought online.

FIG. 1 illustrates an example generator 10 including a controller 100, an alternator 15 and an engine 19. The controller 100 may be electrically coupled directly with the alternator 15 for measuring the output of the alternator 15 or the generator bus 11 (e.g., through a voltage sensor or current sensor). The controller 100 may be coupled directly with the engine 19 for measuring the speed of the engine 19 (e.g., through a tachometer or position sensor). The controller 100 may control the output of the alternator 15 or the speed of the engine 19. The controller 100 may be in communication directly, or indirectly through relay 13, with breaker 25 that selectively connects or disconnects the output of the alternator 15 with the bus 11. Changes in the speed of the engine are reflected in the frequency of the output of the generator. Additional, different, or fewer components may be included.

The controller 100 may determine whether any other generators are connected to the bus 11. In one example, the controller 100 includes an internal setting through which a user enters the configuration of the generator system. In another example, the controller 100 receives data communications from other generator controllers in order to identify connected generators in the system of parallel generators.

The controller 100 may receive operation data for the generator 10 and other generators connected to the bus 11. The operation data may be transmitted through a dedicated communication line or through the bus 11. The operation data may include a connection status for the respective generators and power flows associated with the respective generators.

The controller 100 may determine a loss of speed control or a loss of voltage control at the generator 10 based on the operation data for one or more other generators connected to the bus. In response to the loss of speed control or the loss of voltage control, the controller 100 may generate a command for the generator 10. The command may instruct the generator 10 to disconnect from the bus 11 (e.g., through controller 100 and/or breaker 25).

The determination of a loss of speed control or a loss of voltage control may be based on the power flows of the other generators. The controller 100 may identify reverse power flows from the operation data for the other generator. A reverse reactive power flow may indicate a loss of voltage control, and a reverse real power flow may indicate a loss of speed control. The reverse reactive power is reactive power that, at least in part, flows into generator 10 from the other generators. The reverse real power is real power that, at least in part, flows into from generator 10 from other generators. The controller 100 may compare the reverse reactive power or a reverse real power to a threshold level indicative of the loss of control. The real power at generator 10 may be calculated based on a current measurement and a voltage management. The phase difference between the current measurement and the voltage management of the generator 10 may indicate the direction of real power (e.g., into generator 10). The real power may also be determined using a product of simultaneous samples, among other methods.

The reactive power at generator 10 may be calculated in a variety of techniques. A power triangle technique involves the relationship between apparent power, active power, and reactive power forming a vector triangle. Reactive power is equal to the square root of the difference between the square of the apparent power and the square of the active power. A time delay technique may involve a 90 degrees shift (or a predetermined number of digital samples) in either the voltage waveform or the current waveform. The delayed waveform and the other waveform are multiplied to estimate the reactive power. A filter technique may provide a similar delay using a low pass filter. In one embodiment, the reactive power may also be calculated as a function of a frequency change during the time delay of the 90 degree. For example, the number of samples of 90 degrees shift may be adjusted according to the total number of samples for a cycle. The direction of the reactive power can be established by a comparison of the phase angle between the current waveform and voltage waveform. The reactive power can be computed for a single phase or for multiple phases. The reactive power can be computed by connecting a current transformer to a single phase and comparing to the line-line voltage of another phase, among other methods.

The controller 100 may also receive the results of a comparison of reactive power or real power from another generator or another generator controller. The results are data indicative of a comparison of a generator command value for the other generator to a generator output level of the other generator. The controller 100 may generate a breaker trip command for the generator 10 based on the deviation or difference of the generator command value and generator output level of the generator 10 and based on the similar comparison form the other generator. For example, the breaker trip command may be generated when the deviation for the first generator is more than an allowable range and the deviation for the second generator is less than the allowable range. The threshold level may be a single value. Alternatively, the threshold level may be part of a threshold curve that is compares the deviation over time. In one example, the product of the time that the deviation exceeds the threshold level times the amount that the deviation exceeds the threshold level is compared to a time cumulative threshold. In one example, the deviation is integrated over time to calculate the product. In another example, the threshold level includes a minimum threshold and a maximum threshold. When the deviation exceeds the minimum threshold, the maximum threshold is adjusted as a function of time. For example, when the minimum threshold is initially surpassed, the maximum threshold is at a high level. The maximum threshold is adjusted lower over time in steps or continuously to a low level. Therefore, large deviations trip the breaker in short amounts of time and small deviation trip the breaker if they persist over a longer period of time.

The threshold curve may include additional dimensions in which the time to trip is related to the severity of the loss of control condition. The similar severity-related timing may be for other protective relays on a generator in order to determine which of the protective relays will operate in all conditions. Other protective relays include Over Voltage, Over Frequency, Under Voltage, Under Frequency, Over Power, Reverse Power, Over Current, Loss of Field (reverse VARs), among others.

Figure 2:
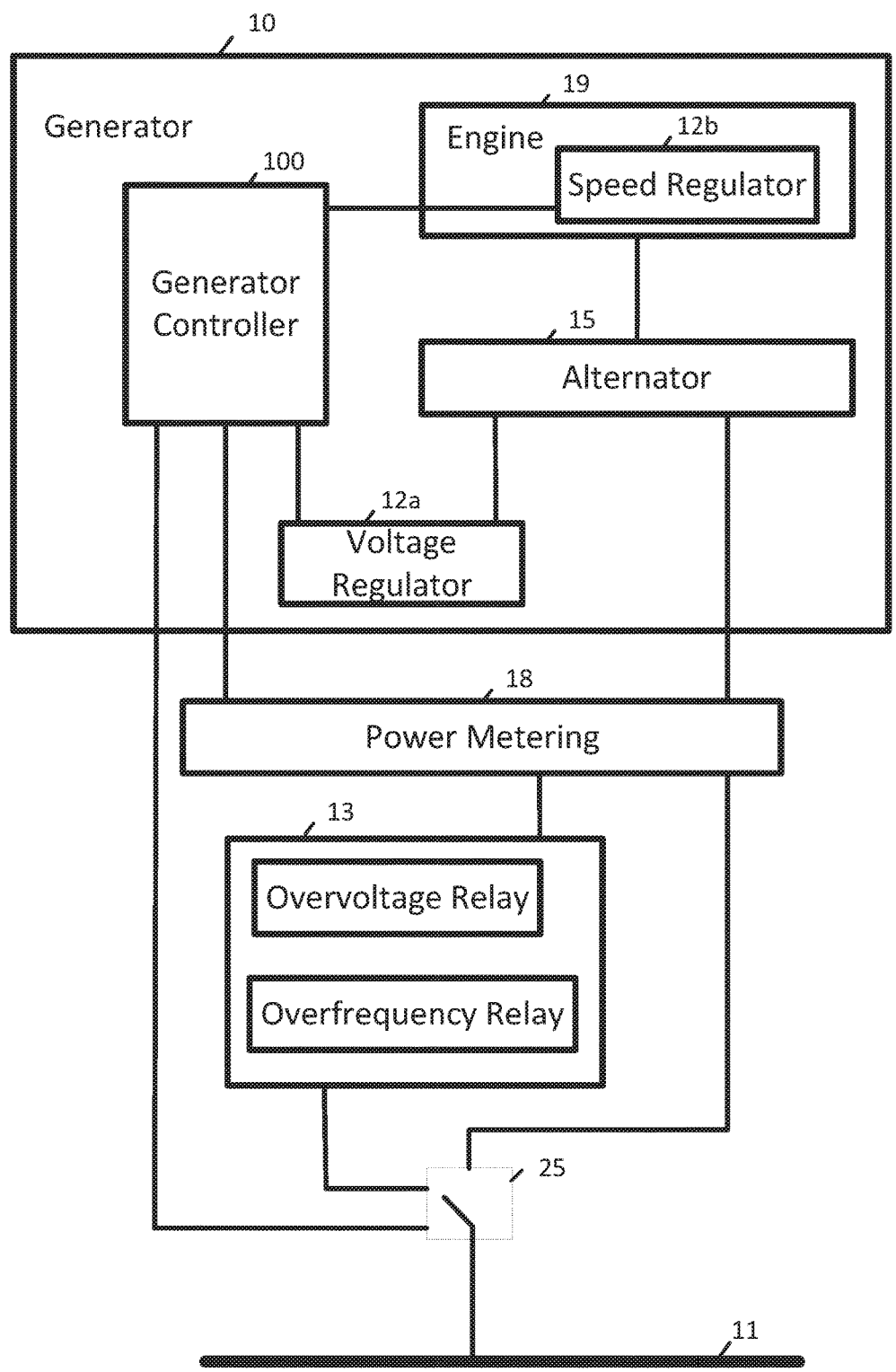
FIG. 2 illustrates another example generator including protective functionality.

FIG. 2 illustrates another example generator 10 in which a regulator includes one or both of a voltage regulator 12a and speed regulator 12b. Similarly, the relay 13 includes one or both of an overvoltage relay and an overfrequency relay. The regulator may experience either a loss of voltage control (the voltage regulator malfunctions) or a loss of speed control (the speed regulator malfunctions). A power metering device 18 measures the output (e.g., voltage, current, and/or frequency) from the alternator 14. The output may be sent to the relay 13 and compared to a threshold value (e.g., voltage threshold, current threshold, and/or frequency threshold) by either the power metering device 18 or the relay 13. Additional, different, or fewer components may be included. The relay 13 connects or disconnects the alternator 15 from the bus 11 based on the examples described herein.

Figure 3:
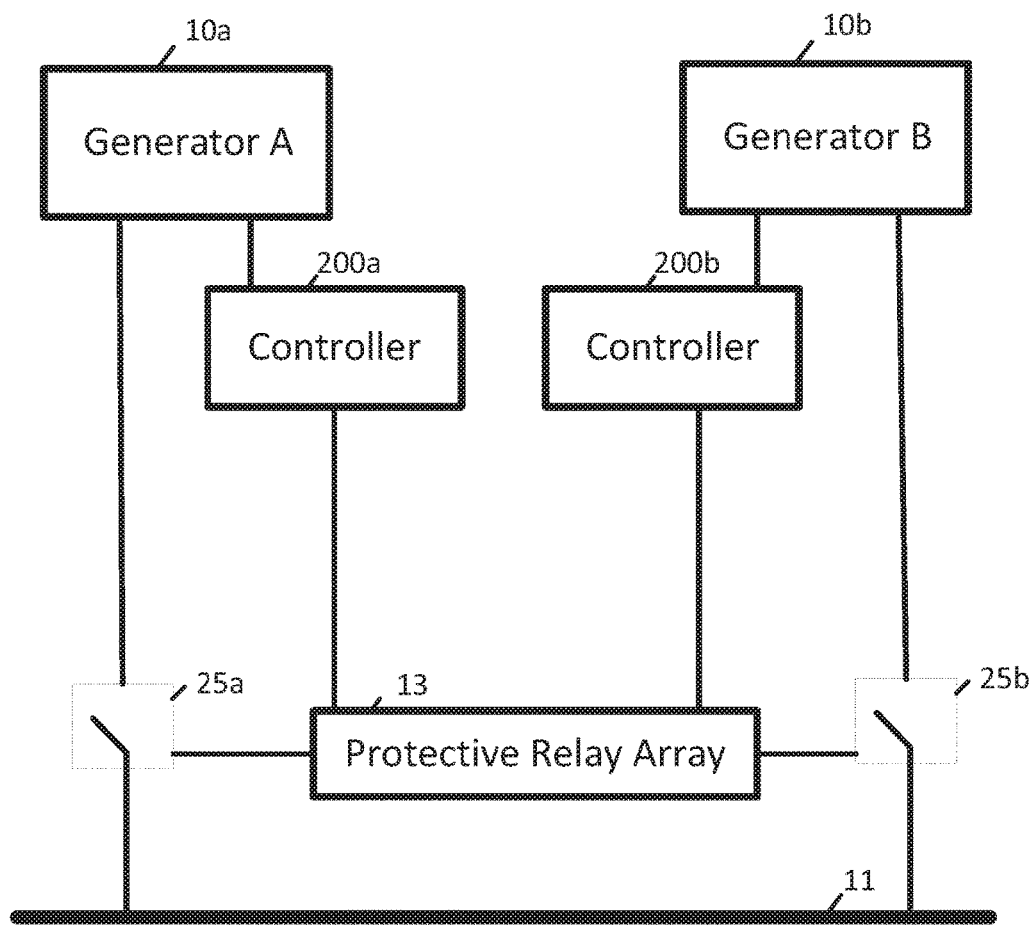
FIG. 3 illustrates an example system of parallel generators including protective functionality.

FIG. 3 illustrates an example system of parallel generators including protective functionality. The system includes generators 10a and 10b in communication with controllers 200a and 200b, respectively, which may be internal or external to the generators. A protective relay array 13 may include one or more relays for each of the generators to trip breakers 25a and 25b. While it is possible that both of the generators 10a and 10b experience a failure at the same time, the following examples include failures at either generator 10a or generator 10b. Additional, different, or fewer components may be included.

The voltage regulator may malfunction for one of the parallel generators. For example, the voltage regulator for the generator 10a may fail to a "full on" failure in which the regulator or controller 200a sends as much field current as possible to the field windings of generator 10a. The "full on" failure may be caused by a malfunctioning integrated circuit or a component failure in the voltage regulator circuit. For example, in the voltage rectifier circuit, a transistor may fail into a short circuit condition, a silicon-controller rectifier (SCR) may fail into a diode condition, or a comparator may fail (e.g., stuck or latched into a specific position). Thus, the output voltage of generator 10a increases to a level higher than expected. The controller of generator 10b detects the higher output voltage of the paralleling bus (caused by generator 10a) and, in response, generator 10b attempts to lower the voltage on the bus 11. Thus, the field current of generator 10b is decreased. Ultimately, generator 10b may have no field current and will be absorbing the VARs from generator 10a.

Even though generator 10a experienced the failure and generator 10b is operating correctly, generator 10b may absorb reactive power from the bus 11, which may be referred to as reverse VARs or reverse reactive power. The reverse VARs would cause a conventional protective relay on generator 10b to trip the breaker 25b. However, controller 200a may identify that generator 10a is experiencing the failure rather than generator 10b and trip breaker 25a. Generator controller 200b may also detect that generator 10a is experiencing the failure and signal generator controller 200a to trip breaker 25a or generator controller 200b may trip breaker 25a in the breaker array.

The speed regulator (e.g., engine governor) may malfunction for one of the parallel generators. For example, the speed regulator for the generator 10a may fail by sticking to a "full on" failure in which the regulator is instructing the engine of generator 10a to run as fast as possible. The engine governor may be electrical or mechanical. The engine governor may fail to a full-on failure when the fuel metering rack, throttle plate or an oil seal of a turbocharger fails allowing the engine to use lubricating oil for combustion. Thus, the output of generator 10a increases to a frequency higher than expected. The controller of generator 10b detects the higher frequency of generator 10a and, in response, the generator 10b decreases the quantity of fuel supplied to the engine in order to regulate the frequency on bus 11. If the load supplied by the generators is low enough, generator 10b may become a load on generator 10a.

Even though generator 10a experienced the failure and generator 10b is operating correctly, generator 10b is absorbing power from generator 10a, or experiencing reverse kW condition. A conventional protective relay may detect the reverse kW and trip the breaker 25b. However, controller 200b may identify a disruption of the expected speed of the generators and determine that the reverse kW at generator 10b actually indicates that generator 10a has experienced the failure. Thus, controller 200b does not trip breaker 25b and trips breaker 25a instead. The controller 200b may trip breaker 25a by sending a message to controller 200a. Alternatively, the controller 200b may directly instruct the protective relay array 13 to trip breaker 25a.

Either or both controllers 200a and 200b ("controller 200") may be configured to identify bus voltages and/or output voltages from the operation data for the generators 10a and 10b. The controller 200 may compare the measured voltage to an expected level. The expected level may be a user setting. When the measured voltage deviates from the expected level at all or by a predetermined allowable range, the controller 200 may determine that one of the generators 10a and 10b is experiencing loss of speed control or loss of voltage control.

In order to identify which of the generators 10a and 10b is failing, the controller 200 may analyze the power flows. The controller 200 may identify reactive power or real power from the operation data for the generators 10a and 10b. The controller 200 may determine the direction of the power flow and identify the source of power flow as the non-failing generator and the recipient of the power flows as the failing generator. The controller 200 may compare the magnitude of the reverse reactive power or the reverse real power to a threshold level. Example threshold levels for the maximum reverse real power may include 10%. Example threshold levels for the maximum reverse reactive power may include 15%.

In one example, the threshold level is part of a threshold curve that provides different threshold levels for different time durations. Threshold levels may be adjusted higher when the reverse reactive power or the reverse real power exceed the maximum levels for a short amount of time, and the threshold levels may be adjusted lower when the reverse reactive power or the reverse real power exceed the maximum levels for a longer amount of time.

The controller 200 may determine a baseline for reverse power flows. The controller 200 may store reverse power flows during normal operation of the generator system. The reverse power flows may be past measurements of current and voltage at the generator bus 11 used to estimate reactive power using the power triangle technique, time delay technique, or filter technique. The baseline may be defined as the average of the reverse power flows or average amplitude of the reverse power flows. The threshold level may be based on the baseline for the reverse power flows.

The controller 200 may control the generator 10a or generator 10b based on the comparison of the reverse power to the threshold level. In one example, the controller 200 triggers breaker 25a or breaker 25b to disconnect one of the generators from the bus 11. When power is being absorbed by generator 10a and the bus speed is lower than expected, the controller 200 may trigger breaker 25a to disconnect generator 10a from the bus 11, but when the power is being absorbed by generator 10a and the bus speed is higher than expected, then the controller 200 may trigger breaker 25b to disconnect generator 10b from the bus 11.

In another example, the controller 200 may control the generator 10a or generator 10b based on the comparison of the reverse reactive power to the threshold level. In one example, the controller 200 triggers breaker 25a or breaker 25b to disconnect one of the generators from the bus 11. When reactive power is being absorbed by generator 10a and the bus voltage is lower than expected, the controller 200 may trigger breaker 25a to disconnect generator 10a from the bus 11, but when the power is being absorbed by generator 10a and the bus voltage is higher than expected, then the controller 200 may trigger breaker 25b to disconnect generator 10b from the bus 11.

In another example, the controller 200 may bring another generator online based on the comparison of the reverse power to the threshold value. When the reactive power for one of the generators exceeds the threshold value, the controller 200 starts a timer and generates a start command for an alternate generator. When the timer reaches a predetermined time (e.g., 10 seconds, 30 seconds, or another value), the controller 200 closes to the alternate generator to the bus 11 and disconnects the failing generator from the generator bus 11.

The threshold level may include multiple levels. The controller 200 may start the alternate generator and keep the failed generator on the bus 11 until the alternate generator is running at a specified level when the reverse power is at a first threshold level. However, the controller 200 may immediately disconnect the failed generator if the reverse power reaches a second threshold level.

The controller 200 may operate in multiple modes. The modes may include a normal mode, an emergency mode, and a hybrid mode. In the normal mode, the controller 200 generates a failure signal triggers to trip the breaker based on a set of faults. In the emergency mode, the controller 200 does not generate a failure signal based on any of the set of faults. In the hybrid mode, the controller 200 generates the failure signal only in reverse power scenarios including reverse real power in one generator indicative of a loss of fuel control in the other generator and reverse reactive power in one generator indicative of a loss of excitation control in the other generator. This may avoid damage to equipment that could result from feeding the loads with a malfunctioning generator and may prevent the disconnection of a properly functioning generator from the load, preventing a loss of power to the critical load while a properly functioning generator is available to supply power to the critical load.

The mode of the controller 200 may be selected by a user, set by an external device, set according to a schedule, or set according to measured data. The user may select the mode using a control panel or a switch. The mode may be selected by a central controller or remote controller (e.g., a mobile device in communication with the controller 200 through a network). A schedule for the mode may be based on times of day or days of the week. For example, normal mode may be run on the weekends and emergency mode may be run on weekdays or normal mode may be run during business hours and emergency mode may be run over night. The mode may be set according to measured data. The measured data may be ambient conditions (e.g., temperature, humidity, barometric pressure), life of the generator (e.g., engine hours, total lifetime), or a load on the system.

Figure 4:
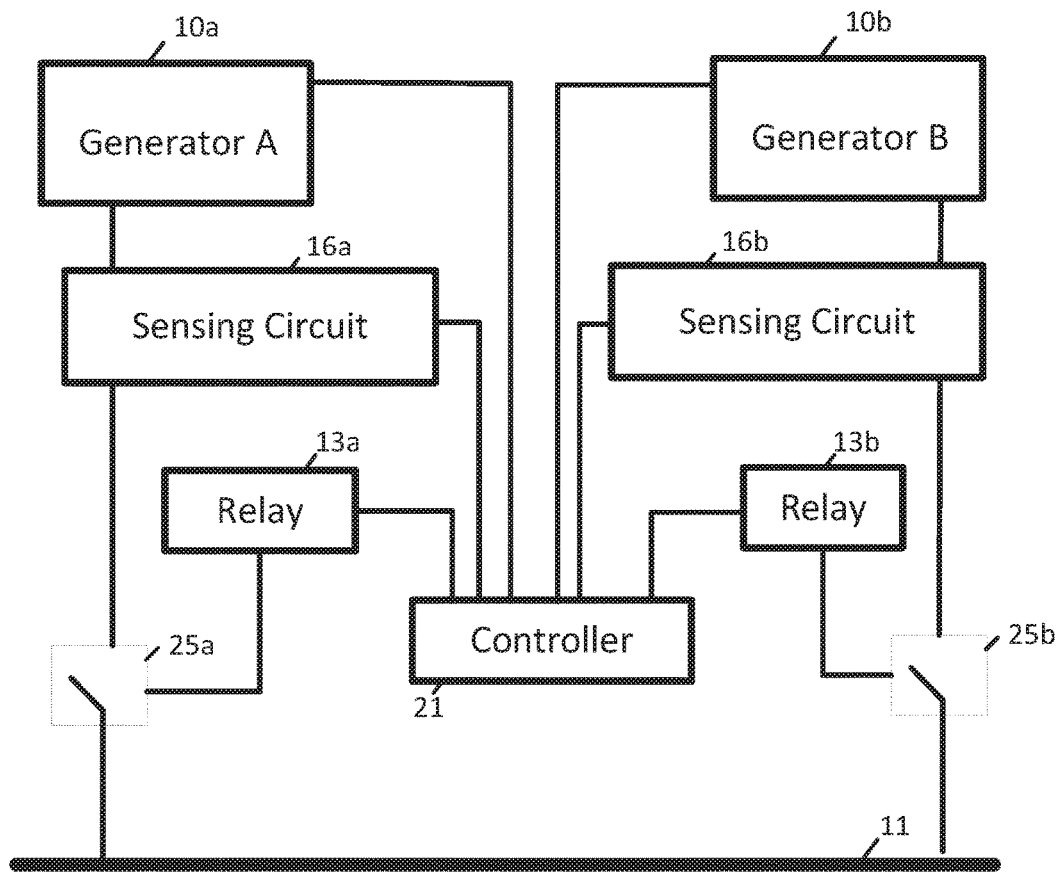
FIG. 4 illustrates another example system of parallel generators including protective functionality.

FIG. 4 illustrates another example system of parallel generators including protective functionality. A central controller 21 may be in communication with generators 10a-b, sensing circuits 16a-b, regulators 12a-b and relays 13a-b. The regulators 12a-b may include speed regulators, voltage regulators, or both. The relays 13a-b are configured to switch breakers 25a-b respectively. The central controller 21 may also be in communication with generators 10a-b. Additional, different, or fewer components may be included.

The central controller 21 may generate commands for the operation of the generators 10a and 10b. The commands may instruct the generators to start running, stop running, increase speeds for the generators, decrease speeds for the generators, increase the field currents, and/or decrease the field currents. The central controller 21 may receive operating parameters of the generators 10a and 10b. The operating parameters may include output voltages, frequencies, currents, reactive power (e.g., VARs), real power (e.g., kWs), or engine speeds. The operating parameters may include measured data collected from one or more sensors in sensing circuits 16a-b. The sensors may include any combination of a voltage sensor, a current sensor, a power sensor, a tachometer, a torque sensor, a deflection sensor, a dynamometer, a positional sensor, or a revolution sensor.

The central controller 21 may calculate real power levels and reactive power levels flowing in and out of the generators 10a and 10b based on power measurements or voltage and current measurements. The central controller 21 may determine voltage levels either at the bus 11 or at the connection between the bus 11 and the generators 10a and 10b. The central controller 21 may determine speed levels based on position sensors. Table 1 illustrates four example scenarios in the system of parallel generators.

TABLE 1

| Scenario | Indicator | Failing Generator | Working Generator |
|---|---|---|---|
| Loss of excitation control (low excitation) | Bus voltage lower than expected. | Reverse reactive power. | Higher than expected reactive power output. |
| Loss of excitation control (high excitation) | Bus voltage higher than expected. | Higher than expected reactive power output. | Reverse reactive power. |
| Loss of fuel control (low fuel) | Speed lower than expected. | Reverse real power. | Higher than expected real power output. |
| Loss of fuel control (high fuel) | Speed higher than expected | Higher than expected real power output. | Reverse real power. |

The central controller 21 may initially identify an indicator that one of the generators has experiences a failure. When the bus voltage or generator output voltages deviate from an expected value, the central controller 21 may determine that there is a loss of excitation control in the generator system. The expected value may be based on a setting or a received generator command sent by the central controller 21. When the voltage is higher than expected, one of the generators may be producing a high excitation current, and when the voltage is lower than expected, one of the generators may be producing a low excitation current.

When the speed of the generators deviates from an expected value, the central controller 21 may determine that there is a loss of fuel control in the generator system. The expected value may be based on a setting or a received generator command sent by the central controller 21. When the speed is higher than expected, one of the generators may be experiencing a high throttle/fueling failure, and when the speed is lower than expected, one of the generators may be producing a low throttle/fueling failure.

The central controller 21 may determine a "full on" or "high level" failure when either the high throttle/fueling failure or the high excitation current. During a "full on" failure, the central controller 21 determines whether one of the generators is experiencing a reverse power flow. If one of the generators is experiencing a reverse power flow, the other generator is flagged as in error or disconnected from the bus.

The central controller 21 may determine a "low level" failure when either the high throttle failure or the high excitation current. During a "low level" failure, the central controller 21 determines whether one of the generators is experiencing a reverse power flow. If one of the generators is experiencing a reverse power flow, the generator experiencing the reverse power flow is flagged as in error or disconnected from the bus.

More than two generators may be included in the generator system. When three generators are connected to the bus 11, the controller 21 may determine which of the three generators is experiencing an odd direction of power flow with respect to the other two. If two of the generators are experiencing a reverse power flow, then the other generator is flagged as in error or disconnected from the bus. If one of the three generators is experiencing a reverse power flow, then that generator may be flagged as in error or disconnected from the bus. The same logic can be applied to four or more generators. If one of the generators is experiencing a reverse power flow, then either one or two generators of the three generators must be malfunctioning. If the bus speed or voltage is low, then the two generators that are not experiencing reverse power are malfunctioning. If the speed or voltage is high, then the generator experiencing the reverse power flow is malfunctioning.

The controller 100, controller 200, or the central controller 21 may be configured to perform load shedding. The central controller 21 or the controller 100 may generate load shedding commands in response to remove or add portions of the load to the generators 10a-b. When one of the generators is flagged as an error or disconnected from the bus, portions of the load may be removed so that the load is within the rated output of the remaining generators. For example, in response to central controller 21 identifying that generator 10a has experienced a loss of excitation control or a low of fuel control based on power flows, the central controller 21 may compare the load on the generator system to the rated output of generator 10b. If the load exceeds the rated output of generator 10b, the central controller 21 may remove a portion of the load from the system.

The generators 10a-b may also include a fuel supply, a speed governor, a cooling system, an exhaust system, a lubrication system, and a starter. Additional, different, or fewer components may be included. Example types of generators include towable generators, portable generators, marine generators, industrial generators, residential generators or other standby generators. The generators may be portable or stationary.

The alternators may include a rotating magnetic field and a stationary armature, a rotating armature with a stationary magnetic field, a linear alternator, or a combination of these. The engines may be combustion engines powered by gasoline, diesel fuel, or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. The engines may also be a turbine turned by steam, water, or wind. Other variations are possible.

Figure 5:
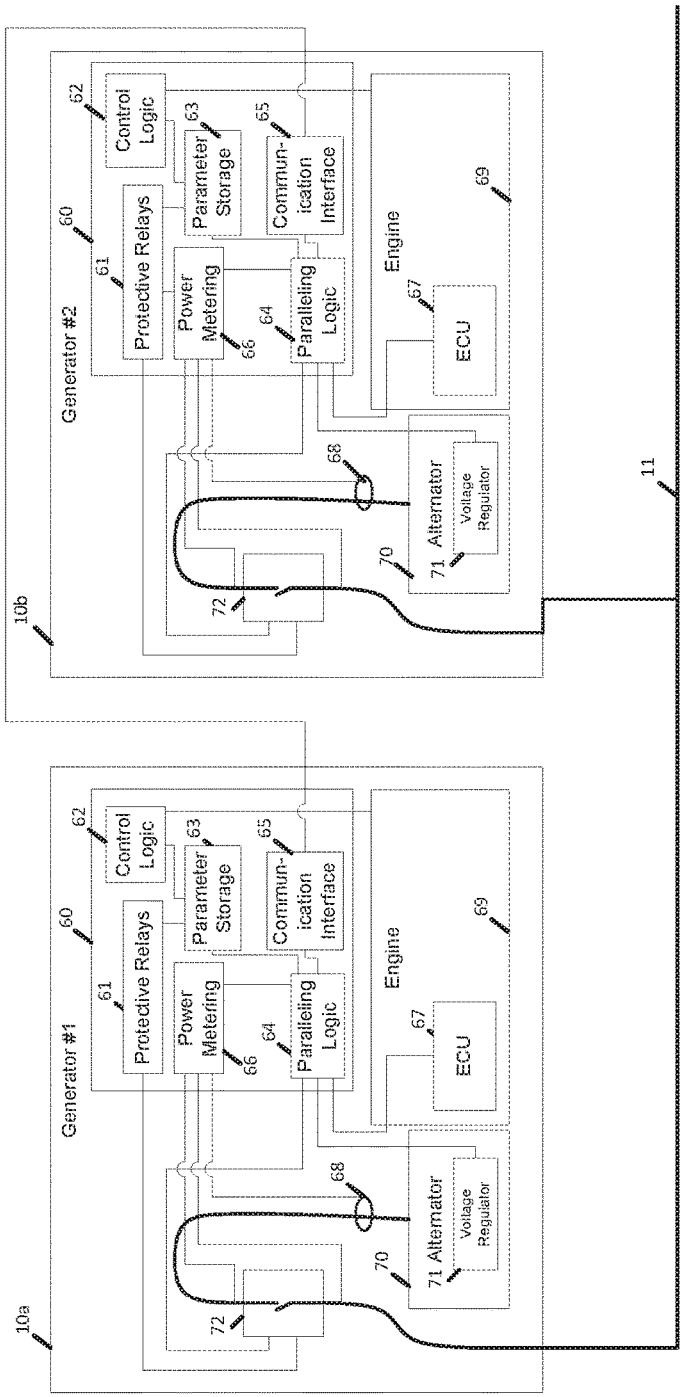
FIG. 5 illustrates another example system of parallel generators including protective functionality.

FIG. 5 illustrates another example system of parallel generators including protective functionality. The system of FIG. 5 may perform any of the algorithms described herein. Each generator 10a and 10b may include a controller 60, an engine 69, an alternator 70, at least one current transformer 68, and a switch 72 (such as a circuit breaker or contactor). The controller 60 may include logic, software components, or hardware components equivalent to protective relays 61, control logic 62, parameter storage 63, paralleling logic 64, a power metering 66 and communication interface 65. The engine 69, in addition to the components described above, may include an engine control unit 67. The alternator 70 may include a voltage regulator 71. Additional, different, or fewer components may be included in the system of FIG. 5.

The paralleling logic 64 establishes parallel operation between the generator 10a and the generator 10b. The paralleling logic determines when to open and close the switch 72 in order to bring the generators into parallel operation. The paralleling logic may include speed and voltage bias outputs that control the speed and voltage for this generator 10a and engine 69. The communication interface(s) 65 communicate to coordinate the paralleling operation.

The parameter storage 62 includes threshold values for the expected output values for the alternator. The threshold values may include an expected output voltage, an expected output current, and an expected output frequency. The expected values may be defined by control logic 62 and/or paralleling logic 64. The expected values may be dependent on user settings or load characteristics. The parameter storage 62 may include threshold values for power flow between the generators and the bus. The threshold values for power flow may be selected to insure that power flows from the generators to the bus. However, the threshold values for power flow may allow for small amounts of reverse power.

The voltage regulator 71 controls output of the alternator 70. The power metering 66 may monitor measurements of one or more of frequency, voltage or current from the output of the alternator 70. Feedback on the output may be measured and provided by the current transformer 68 or other sensor devices. The voltage regulator 71 may experience a failure which causes too much field current to be sent (an overcurrent condition) to the generator 10a. Similarly, the ECU 67 may fail by increasing the speed of the engine 69 to an overspeed level. Either the overcurrent condition or the overspeed condition may cause power to be transferred from generator 10a to generator 10b.

The control logic 62 may control the speed of the engine 69. The control logic 62 may identify that the overspeed condition or the overcurrent condition is occurring in one generator. The control logic 62 may compare an expected output value (e.g., expected voltage, expected current, or expected frequency) for the generator 10a to values measured by the power metering 66 or receive comparison results from the protective relay 61.

The control logic 62 may identify that power is being transferred to the other generator. The control logic 62 may receive power measurements from the power metering 66 to identify the magnitude and/or direction of power levels being transferred from the generator 10a to the bus or being transferred from the bus to the generator 10a. The control logic 62 may compare expected values for power (e.g., reactive power or real power) to value measured by power metering 66 receive comparison results from the protective relay 61.

The control logic 62 may identify a failure at the generator 10a when the measured value exceeds the expected output value and power is flowing from generator 10a to generator 10b. In response to the failure, the control logic 62 may generate a command for the switch 72 to disconnect the generator 10a from the bus. The communication interface(s) 65 communicate to exchange measured values and comparison results between the generators.

Figure 6:
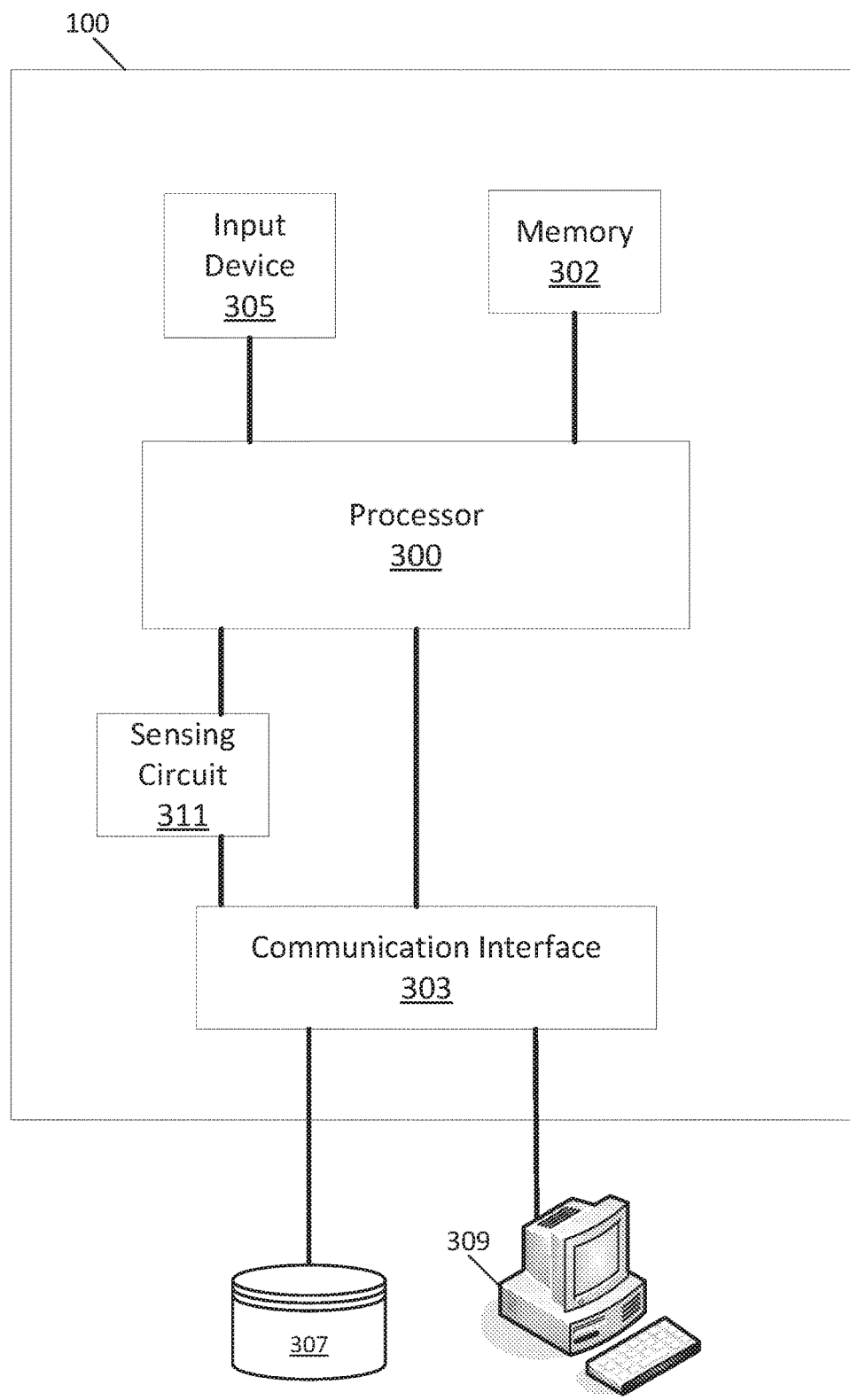
FIG. 6 illustrates an example controller for the examples of FIGS. 1-5.

FIG. 6 illustrates an example generator controller 100 of the system for protective functions. The controller 100 may include a processor 300, a memory 302, and a communication interface 303. The controller 100 may be connected to a workstation 309 or another external device (e.g., control panel) and/or a database 307. Optionally, the generator controller 100 may include an input device 305 and/or a sensing circuit 311. The sensing circuit 311 receives sensor measurements (e.g., power, current, voltage, speed) for the operation of the generator or connected generators. Additional, different, or fewer components may be included.

The memory 302 may be configured to store expected operating parameters for a system of generators. The expected operating parameters may be based on settings sent to the system of generators or rated output levels for the system of generators. The expected operating parameters may include a threshold for reverse power and a threshold for output voltage. The input device 305 may receive user inputs for sending the power threshold, speed thresholds, and voltage thresholds.

The communication interface 303 or processor 300 may receive operation data of current output levels for the system of generators. The operation data may include real power levels, reactive power levels and an output voltage level for each generator in the system of generators. The processor 300 may determine deviations between a reverse power level for the first generator and the threshold for reverse power. The processor 300 may also determine deviations between an output voltage and the threshold for output voltage and/or speed and threshold for speed.

The processor 300 may control one or more of the system of generators in response to the reverse power level exceeding the threshold. In one example, the processor 300 generates a disconnection command for the generator receiving the reverse power when the output voltage is lower than the expected level or the speed is lower than the expected level. In another example, the processor 300 generates a disconnection command for the generator not receiving the reverse power when the output voltage is higher than the expected level or the speed is higher than the expected level.

Figure 7:
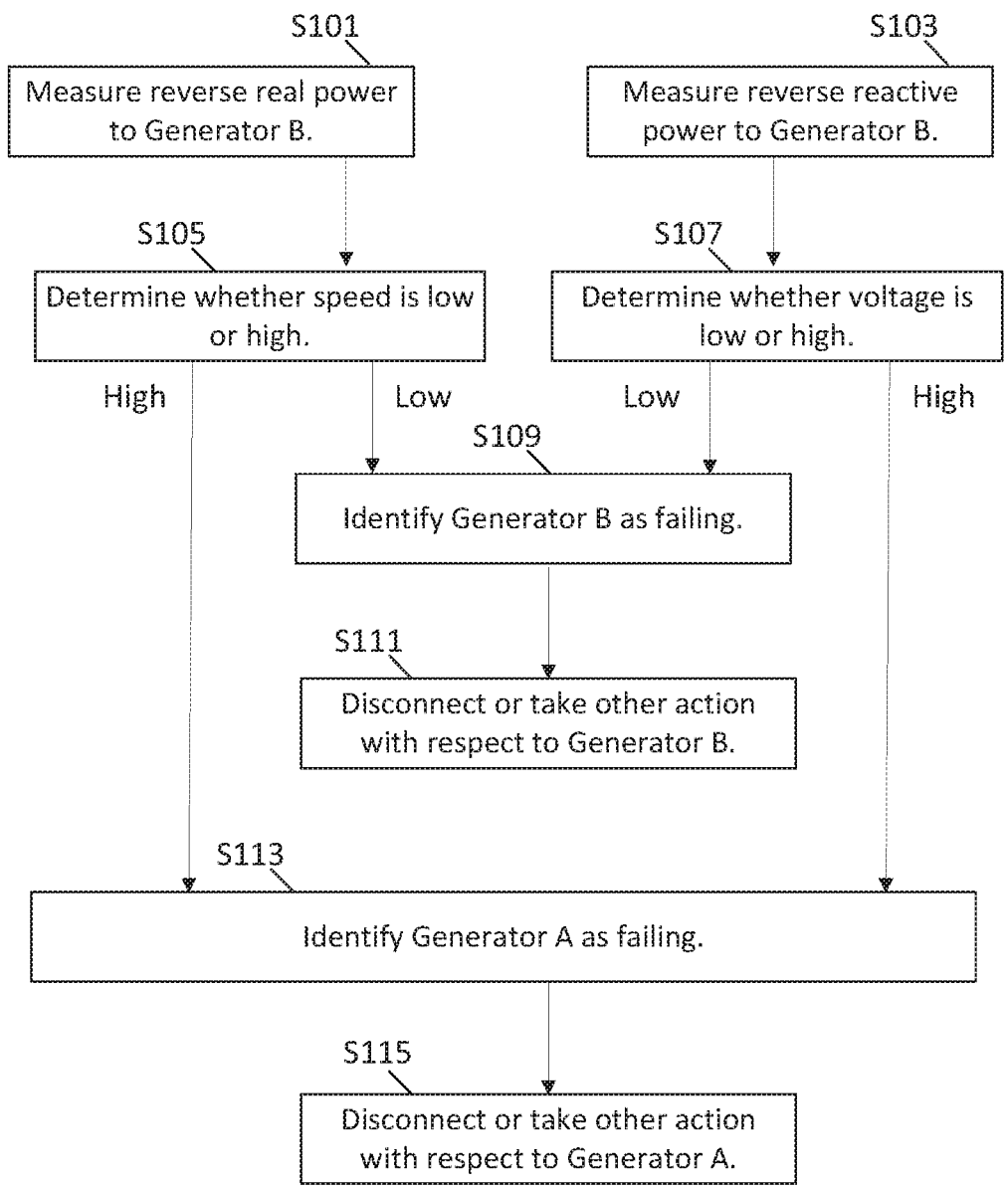
FIG. 7 illustrates an example flowchart for operation of the controller of FIG. 6.

FIG. 7 illustrates example flowchart for operation of the controller of FIG. 5. The methods in FIG. 7 may, in some instances, be implemented as logic or software executable by a controller, such as controller 100 or controller 200. Additional, different, or fewer acts may be provided. The acts may be performed in the order shown or other orders. The acts may also be repeated.

At act S101, the controller 100 measures reverse real power in a power flow between two or more generators (e.g., from generator A to generator B). At act S103, the controller 100 measured reverse reactive power in the power flow. When power is transferred from one generator to another generator, there is a failure in the system. Using any of the techniques above, the controller 100 identifies the power flow as either real or reactive.

At act S105, when the power flow is real, the controller 100 determines whether the speed of one or more of the generators is higher or lower than the predicted speed. When the speed is high, then the generator that is the source of the excess power is failing. Therefore, at act S113, generator A is identifies as failing. When the speed is low, the generator that is the sink of the excess power is failing. Therefore, at S109, generator B is identified as failing.

At act S107, when the power flow is reactive, the controller 100 determines whether the output voltage of the generator system is higher or lower that the predicted voltage. When the voltage is high, then the generator that is the source of the excess power is failing. Therefore, at act S113, generator A is identified as failing. When the voltage is low, the generator that is the sink of the excess power is failing. Therefore, at S109, generator B is identified as failing.

At act S111, when generator B is failing, generator B may be disconnected from the generator system by triggering a circuit breaker associated with generator B. At act S115, when generator A is failing, generator A may be disconnected from the generator system by triggering a circuit breaker associated with generator A.

Other actions may be taken. In one example, controller 100 connects a replacement regulator (e.g., speed governor or voltage regulator) in the failing generator. In other words, using switches, the controller 100 removes the regulator and connects a new regulator. The controller 100 may generate an error message for the user that the regulator or the generator has failed and should be repaired or replaced. The error message may describe whether the generator has experienced a loss of fuel control or a loss of excitation control.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device, such as a secure digital (SD) memory card.

The input device 305 may include a control panel coupled to or integrated with one of the generators. The input device 305 may be one or more buttons, keypad, keyboard, mouse, touch pad, voice recognition circuit, or other device or component for inputting data to the controller 100. The input device 203 and a display may be combined as a touch screen. The input device 203 may be an interface connected to a mobile device such as a smart phone, computer, or tablet for sending user settings to the controller 100.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 303 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
a memory configured to store expected operating parameters for a system of generators including a first generator and a second generator, wherein the expected operating parameters include a threshold for reverse power and a threshold for output voltage; and
a processor configured to receive operation data for the first generator and the second generator, wherein the operation data include reverse power levels and an output voltage level, wherein the processor is configured to determine deviations between a reverse power level for the first generator and the threshold for reverse power and between an output voltage and the threshold for output voltage, wherein the processor is configured to generate a disconnection command for the second generator when the deviation for the reverse power level for the first generator exceeds an allowable range.

2. The apparatus of claim 1, wherein the allowable range is a first allowable range, wherein the processor is configured to generate a disconnection command for the second generator when the deviation for the reverse power level for the first generator exceeds the first allowable range and the deviation between the output voltage and the threshold for output voltage exceeds a second allowable range.

3. The apparatus of claim 1, wherein the deviation for the reverse power level for the first generator indicates reverse real power and a loss of speed control at the second generator.

4. The apparatus of claim 1, wherein the deviation for the reverse power level for the first generator indicates reverse reactive power and a loss of excitation control at the second generator.

5. The apparatus of claim 1, wherein the processor is operable in a normal mode and an emergency mode,
wherein, in the normal mode, a disconnection command for the second generator is initiated when the deviation for the reverse power level for the first generator exceeds the allowable range, and wherein, in the normal mode, no disconnection command is initiated.

6. The apparatus of claim 5, wherein the processor is operable in a hybrid mode for initiating a timer based on the deviation for the reverse power level for the first generator exceeds the allowable range, wherein the disconnection command is initiated when the timer reaches a predetermined level.

7. A system comprising:
a first generator coupled to a generator bus;
a second generator coupled to the generator bus; and
a controller configured to identify a power flow from the first generator to the second generator through the generator bus and determine a loss of generator control based on operation data for the first generator or the second generator,
wherein the controller disconnects the second generator based on a loss of speed control or a loss of voltage control, wherein the power flow includes reactive power when the loss of generator control is a loss of excitation control and the power flow includes real power when the loss of generator control is a loss of speed control.

8. A method comprising:
storing, at a memory, expected operating parameters for a system of generators including a first generator and a second generator,
wherein the expected operating parameters include a threshold for reverse power and a threshold for output voltage;
receiving, at a processor, operation data for the first generator and the second generator, wherein the operation data include reverse power levels and an output voltage level,
determining, by the processor, deviations between a reverse power level for the first generator and the threshold for reverse power;
determining, by the processor, deviations between an output voltage and the threshold for output voltage; and
initiating, in a normal mode, a disconnection command for the second generator is initiated when the deviation for the reverse power level for the first generator exceeds an allowable range, and wherein, in the normal mode, no disconnection command is initiated.

9. The method of claim 8, further comprising:
generating a disconnection command for the second generator when the deviation for the reverse power level for the first generator exceeds a first allowable range and the deviation between the output voltage and the threshold for output voltage exceeds a second allowable range.

10. The method of claim 8, further comprising:
generating a disconnection command for the second generator when the deviation for the reverse power level for the first generator exceeds an allowable range.

11. The method of claim 10, wherein the deviation for the reverse power level for the first generator indicates reverse real power and a loss of speed control at the second generator.

12. The method of claim 10, wherein the deviation for the reverse power level for the first generator indicates reverse reactive power and a loss of excitation control at the second generator.

13. The method of claim 8, further comprising:
initiating, in a hybrid mode, a timer based on the deviation for the reverse power level for the first generator exceeds the allowable range, wherein the disconnection command is initiated when the timer reaches a predetermined level.

14. The method of claim 8, further comprising:
receiving a user selection for an operation mode selected from a normal mode, a hybrid mode, and an emergency mode.

15. The method of claim 14, wherein the emergency mode maintains connections during failures.

16. The method of claim 14, further comprising:
accessing, from the memory, an operation mode from a plurality of operation modes based on handling failures in the system of generators.

* * * * *